(12) United States Patent
Keller et al.

(10) Patent No.: US 9,456,390 B2
(45) Date of Patent: *Sep. 27, 2016

(54) METHOD AND APPARATUSES FOR MAINTAINING SERVICE CONTINUITY TO A CENTRALIZATION AND CONTINUITY APPLICATION SERVER

(71) Applicant: TELEFONAKTIEBOLAGET L M ERICSSON (PUBL), Stockholm (SE)

(72) Inventors: Ralf Keller, Würselen (DE); Fredrik Lindholm, Stockholm (SE); Jian Wang, Beijing (CN)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/755,349

(22) Filed: Jun. 30, 2015

(65) Prior Publication Data

US 2015/0304899 A1 Oct. 22, 2015

Related U.S. Application Data

(63) Continuation of application No. 13/061,206, filed as application No. PCT/EP2008/061332 on Aug. 28, 2008, now Pat. No. 9,106,664.

(51) Int. Cl.
*H04W 36/00* (2009.01)
*H04W 36/30* (2009.01)
(Continued)

(52) U.S. Cl.
CPC ...... *H04W 36/0022* (2013.01); *H04L 65/1016* (2013.01); *H04L 69/40* (2013.01); *H04W 36/165* (2013.01); *H04W 36/30* (2013.01); *H04W 36/0033* (2013.01); *H04W 80/10* (2013.01)

(58) Field of Classification Search
CPC ........... H04W 36/0022; H04W 80/10; H04W 36/0033; H04L 65/1016; H04L 65/1006; H04L 69/40
USPC ......................................................... 709/244
See application file for complete search history.

(56) References Cited

U.S. PATENT DOCUMENTS 6,081,705 A * 6/2000 Houde ..................... H04W 8/26
370/466
8,116,776 B1 * 2/2012 Jagadeesan ........... H04W 36/00
370/331
(Continued)

OTHER PUBLICATIONS

Alcatel-Lucent, "Correlation ID for SRVCC, SC and ICS sessions." 3GPP TSG SA WG2 Meeting #67. Aug. 25-29, 2008. TO S2-085662. Sophia Antipolis, France.
(Continued)

*Primary Examiner* — Kevin Bates
*Assistant Examiner* — Nazia Naoreen (57) ABSTRACT

A method and apparatus for maintaining service continuity for User Equipment accessing an IP Multimedia Subsystem communication network. A routing identifier is established that identifies a Service Centralization and Continuity Application Server allocated to the User Equipment. The routing identifier is sent to the User Equipment. In the event of disruption to the service between the User Equipment and the Service Centralization and Continuity Application Server, a handover message is sent from the User Equipment via a Circuit Switched access network. The handover message includes the routing identifier, and is then forwarded to the identified Service Centralization and Continuity Application Server. This allows the same Service Centralization and Continuity Application Server to be used after the handover as was used before the handover, thereby providing service continuity.

12 Claims, 5 Drawing Sheets

(51) Int. Cl.
*H04W 36/16* (2009.01)
*H04L 29/06* (2006.01)
*H04L 29/14* (2006.01)
*H04W 80/10* (2009.01)

(56) References Cited

U.S. PATENT DOCUMENTS

| | | | |
|---|---|---|---|
| 8,160,559 B2 | 4/2012 | Buckley et al. | |
| 8,170,564 B2 | 5/2012 | Sugiura et al. | |
| 2003/0186694 A1* | 10/2003 | Sayers | H04L 69/169 455/426.1 |
| 2005/0165917 A1 | 7/2005 | Le et al. | |
| 2006/0276192 A1* | 12/2006 | Dutta | H04W 36/005 455/436 |
| 2007/0021096 A1* | 1/2007 | Arslan | H04M 15/06 455/403 |
| 2007/0238468 A1 | 10/2007 | Buckley et al. | |
| 2009/0080382 A1* | 3/2009 | Chen et al. | 370/331 |
| 2009/0276532 A1* | 11/2009 | Bishop | H04L 65/1073 709/228 |
| 2010/0009681 A1* | 1/2010 | Schneyer | H04L 29/12594 455/435.1 |
| 2010/0199330 A1* | 8/2010 | Schott | H04L 65/1073 726/4 |
| 2011/0096746 A1* | 4/2011 | Belling | H04L 65/1073 370/329 |

OTHER PUBLICATIONS

Huawei, "Service Control Signalling Path handover, Gm-Gm." 3GPP TSG-SA WG2 Meeting #66. S2-084913. Jun. 23-27, 2008. Montreal, Canada.

GSM, "IP Multimedia Subsystem (IMS) Centralized Services, Stage 2 (Release 8)". 3GPP TS 23.292 v8.0.0. Jun. 2008. Sophia Antipolis, France.

"Digitial Cellular Telecommunication system (Phase 2+); Universal Mobile Telecommunications System (UMTS), IP Multimedia Subsystem (IMS); Stage 2 (3GPP TS 23.228 version 8.5.0 Release 8); ETSI TS 123 228" XP014042066. Jun. 1, 2008. p. 1-242. Sophia Antipolis Cedex, France.

3rd Generation Partnership Project; Technical Specification Group Services and System Aspects; IP Multimedia Subsystem (IMS) Centralized Services; Stage 2 (Release 8). 3GPP TS 23.292 v1.0.0 (Jun. 2008).

3rd Generation Partnership Project; Tecl1nical Specification Group Services and System Aspects; IP Multimedia Subsystem (IMS); Stage 2 Release 8). 3GPP TS 23.228 v8.3 0 (Dec. 2007).

3rd Generation Partnership Project; Technical Specification Group Services and System Aspects; Unstructured Supplementary Service Data (USSD)—Stage 1 (Release 7). 3GPP TS 22.090. V7.0.0, (Jun. 2006).

3rd Generation Partnership Project; Tecl1nical Specification Group Services and Architecture; IP Multimedia Subsystem (IMS) Service Continuity; Stage 2 Release 8). 3GPP Draft 23.237 v1.0.0 (Jun. 2008).

* cited by examiner

METHOD AND APPARATUSES FOR MAINTAINING SERVICE CONTINUITY TO A CENTRALIZATION AND CONTINUITY APPLICATION SERVER

RELATED APPLICATIONS

This application is a continuation of co-pending U.S. patent application Ser. No. 13/061,206 filed Feb. 28, 2011, which is a 371 of International Application No. PCT/EP2008/061332, filed Aug. 28, 2008, the disclosures of which are fully incorporated herein by reference.

TECHNICAL FIELD

The invention relates to the field of maintaining service continuity in an IP Multimedia Subsystem communication network.

BACKGROUND

The IP Multimedia Subsystem (IMS) is the technology defined by the Third Generation Partnership Project (3GPP) to provide IP Multimedia services over mobile communication networks. IP Multimedia services provide a dynamic combination of voice, video, messaging, data, etc. within the same session. As the number of basic applications, and the media which it is possible to combine, increases, so will the number of services offered to the end users, giving rise to a new generation of personalised, rich multimedia communication services. The IMS is defined in the 3GPP Specification 23.228.

The IMS makes use of the Session Initiation Protocol (SIP) to set up and control calls or sessions between user terminals (or user terminals and application servers). The Session Description Protocol (SDP), carried by SIP signaling, is used to describe and negotiate the media components of the session. Whilst SIP was created as a user-to-user protocol, IMS allows operators and service providers to control user access to services and to charge users accordingly.

IMS relies on Internet Protocol (IP) as a transport technology. Using IP for voice communications, however, presents some challenges, especially in the mobile community where Voice Over IP (VoIP) enabled packet switched (PS) bearers may not always be available. To allow operators to start offering IMS-based services while voice enabled PS-bearers are being built out, the industry has developed solutions that use existing Circuit Switched (CS) networks to access IMS services. These solutions are referred to as IMS Centralized Services (ICS). ICS is also the name of the Work Item in 3GPP Release 8 addressing these matters (IP Multimedia System (IMS) centralized services (Release 8), 3GPP TS 23.292 V8.0.0).

A functional entity in an IMS network is a Service Centralization and Continuity Application Server (SCC AS), which is an application based in a user's home network IMS Application. The SCC AS provides functionality required to enable IMS Centralized Services. The SCC AS is inserted in a session path using originating and terminating Initial Filter Criteria (iFCs) and configured such that it is the first AS in an originating iFC chain and the last AS in a terminating iFC chain.

User Equipment (UE) typically communicates with the SCC AS for service control using the Gm reference point. In come circumstances, using a Gm reference point may not be possible (e.g. when using GERAN and the GERAN does not support DTM). In this case, a service control signaling path is handed over to I1. 3GPP TS 23.292, section 7.8 describes the procedure for signaling path handover from Gm to I1 when Gm is lost or not available. The UE sends the handover request to the SCC AS over I1 and the SCC AS is informed that it should now use I1 instead of Gm for controlling the ongoing session with the UE.

When a handover from Gm to I1 is required, the handover request should be routed from the UE over I1 to the same SCC AS that was previously handling the session over Gm. Suppose, for example, that Unstructured Supplementary Service Data (USSD) is used to communicate over I1. Using current methods, a Home Location Register (HLR) can be statically configured with an E.164 number for the ICS service code for a range of subscribers. This E.164 number can represent the actual SCC AS or a Representative AS (see IP Multimedia Subsystem (IMS); Stage 2 (Release 8), 3GPP TS 23.228 V8.3.0) that performs dynamic allocation of users to an SCC AS. However, routing over Gm is not synchronized with routing over I1. No solution exists to allow the UE to route a request over I1 to the same SCC AS over Gm. There is therefore no guarantee that in the event of a handover from Gm to I1,the handover request over I1 will be routed to the same SCC AS that was previously handling the session over Gm, and so the handover may fail. This problem exists not only for the signaling path handover from Gm to I1,but also in the case of service continuity where a service transfer is made from a Packet Switched (PS) to a Circuit Switched (CS) access.

SUMMARY

The inventors have devised a method and apparatus for maintaining service continuity in the event of a handover from a Gm to an I1 reference point or from a Packet Switched (PS) only to a Circuit Switched (CS) network, by identifying the Service Centralization and Continuity Application Server (SCC AS) in such a way that the same SCC AS can be used after handover.

According to a first aspect of the invention, there is provided a method of maintaining service continuity for User Equipment (UE) accessing an IP Multimedia Subsystem (IMS) communication network. A routing identifier identifying a SCC AS allocated to the UE is established, and sent to the UE. In the event of disruption to the service between the UE and the SCC AS, a handover message is sent from the UE via a CS access network. The handover message includes the routing identifier, and is then forwarded to the identified SCC AS. This allows the same SCC AS to be used after the handover as was used before the handover, thereby providing service continuity.

As an option, the method can be used when the disruption is caused by handover of signaling between the UE and the SCC AS from a Gm reference point to an I1 reference point, or alternatively, when the disruption is caused by handover from a PS access network to the CS access network.

Optionally, the routing identifier is sent to the UE in one of a Session Initiation Protocol 200 OK message and a Session Initiation Protocol INVITE message, depending on whether the message originates at the UE or terminates at the UE.

As an option, the handover message is sent from the CS access network to a Representative Application Server, and the Representative Application Server selects a SCC AS on the basis of the routing identifier prior to forwarding the handover message to the identified SCC AS.

The handover message is optionally sent in an Unstructured Supplementary Service Data format.

According to a second aspect of the invention, there is provided a UE for use in an IMS network. The UE is provided with a receiver for receiving a routing identifier identifying a SCC AS allocated to the UE. A memory is provided for storing the received routing identifier, and a processor is provided for detecting disruption to an ongoing service between the UE and the SCC AS. A transmitter is also provided for, in the event that disruption is detected, sending a handover message to an access network node, the handover message including the routing identifier. This allows the UE to request the same SCC AS after the handover as was used before the handover.

The processor is optionally arranged to detect a loss of Gm availability between the UE and the SCC AS. Alternatively, or additionally, the processor is optionally arranged to detect a handover from a PS access network to a CS access network.

According to a third aspect of the invention, there is provided a HLR for use in a communication network. The HLR is provided with a processor for allocating a routing identifier to a SCC AS allocated to a UE, and a memory for storing the routing identifier and an associated E.164 number for the SCC AS. A transmitter is provided for sending the routing identifier to the UE.

As an option, the HLR is provided with a receiver for receiving a handover request from the UE, the handover request including the routing identifier. A second processor is provided for using the routing identifier to determine the E.164 number of the SCC AS, and a second transmitter is provided for forwarding the handover request to the SCC AS. In this case, the HLR optionally is provided with a third processor for removing the routing identifier from the received handover request prior to forwarding the handover request to the SCC AS.

According to a fourth aspect of the invention, there is provided a SCC AS for use in an IMS communication network. The SCC AS is provided with a processor for allocating a routing identifier to the SCC AS, a memory for storing the routing identifier, and a transmitter for sending the routing identifier to the UE.

DETAILED DESCRIPTION

Figure 1:
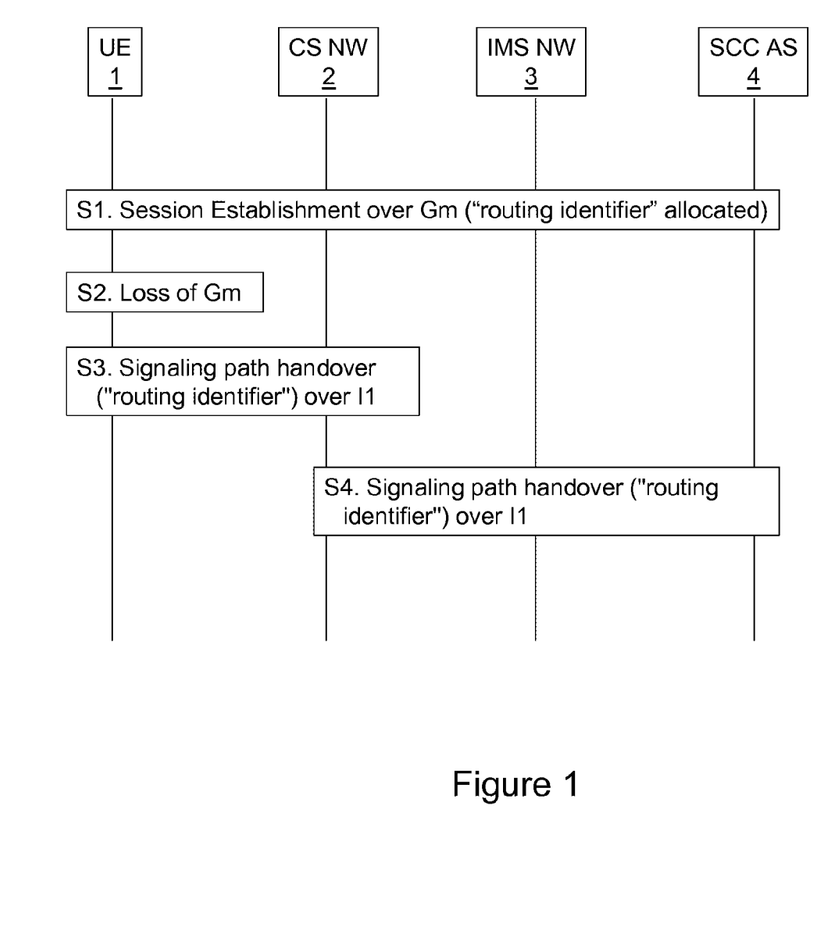
FIG. 1 is a signaling diagram according to an embodiment of the invention.

Referring to FIG. 1 herein, there is illustrated a UE 1, a Circuit Switched network 2, an IMS network 3 and an Application Server 4 such as an SCC AS or a representative AS. Each SCC AS 4 is allocated a routing identifier, which can be carried in USSD signaling. The allocation of the routing identifier can be performed in any suitable node, such as a Home Location Register (HLR).

The following steps are performed:

S1. When the UE 1 initiates a session over a Gm reference point, the SCC AS 4 is allocated to the UE 1 for handling the session using standard IMS procedures. A routing identifier is created according to standard USSD procedures. The routing identifier is known to the SCC AS 4, and can be used by a HLR to find the SCC AS 4, for example by mapping the identifier to an E.164 number which points to the SCC AS 4. The routing identifier of the SCC AS 4 is then sent back to the UE 1 over Gm, for example in the response of the first INVITE send by the UE 1 or in a terminating INVITE.

S2. The UE 1 loses Gm capability.

S3. The UE sends a request for signaling path handover due to loss of Gm capability, and uses the routing identifier over I1.

S4. A HLR in the CS network 2, when it receives this message, maps the routing identifier directly to the SCC AS 4 that was handling the service over Gm, and forwards the signaling path handover message to the SCC AS 4. Alternatively, the HRL forwards the signaling path handover message to the representative AS which in turn uses the routing identifier to select the correct SCC AS 4.

Figure 2:
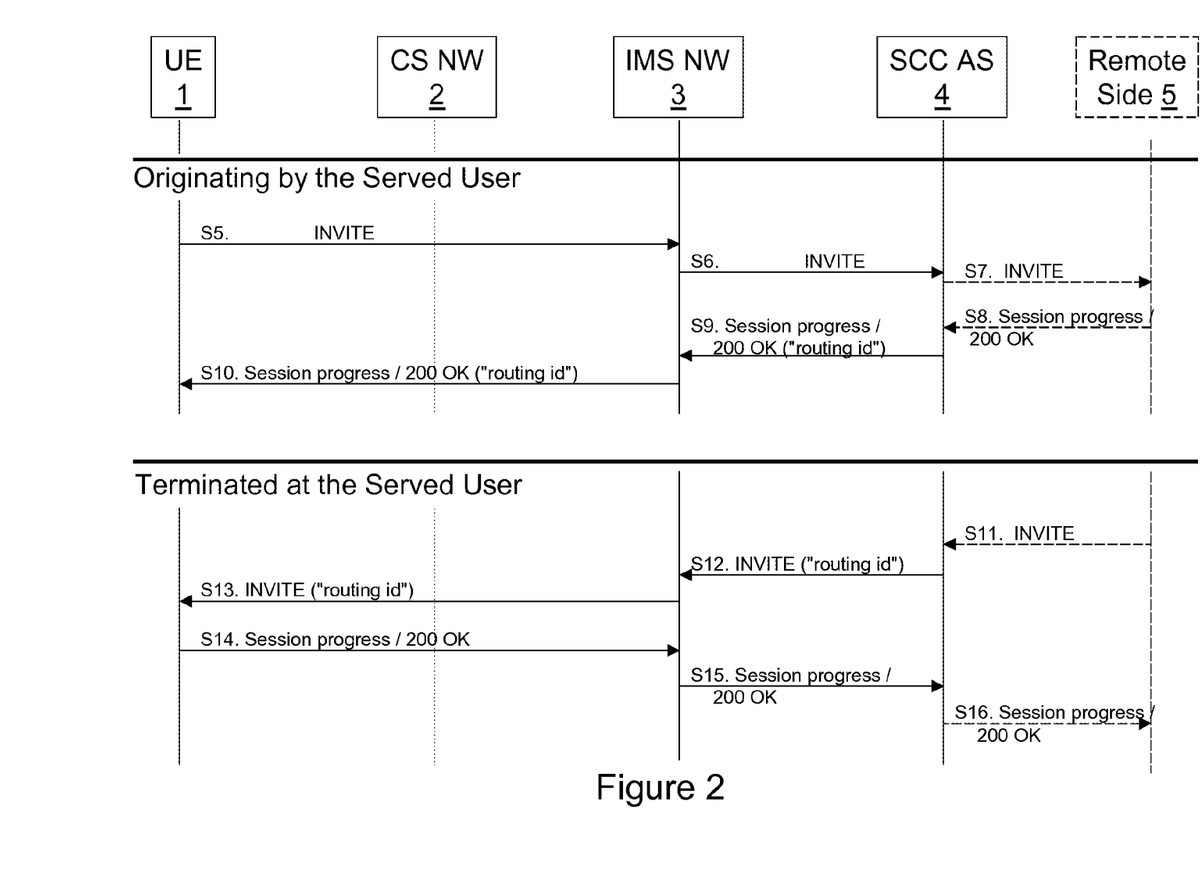
FIG. 2 is a signaling diagram illustrating routing identifier assignment according to an embodiment of the invention.

Referring to FIG. 2 herein, assignment and delivery of the routing identifier is illustrated. For sessions originating from the served user UE, (outgoing calls), a normal SIP INVITE procedure is performed, illustrated by steps S5 to S8. Then the SCC AS 4 replies to the IMS network 3 with a SIP 200 OK message (step S9), the routing identifier is included in that message, and forwarded (S10) to the UE 1 from the IMS network 3. As mentioned above, the routing identifier is determined by which SCC AS 4 has been assigned to the user, and is therefore also know to the SCC AS 4 when adding it to the SIP 200 OK.

For terminating requests (incoming calls), illustrated in steps S11 to S16, the routing identifier is added to the incoming INVITE to the UE 1, as shown in step S12.

There are several ways in which the routing identifier can be included in the SIP message (either the 200 OK or the INVITE). Example include:

A separate header in the SIP message, dedicated for the routing identifier, i.e., "P-Routing-Identifier: xyzabc";

As part of an existing header in the SIP message, such as the 'via' header, or 'contact' header.

Figure 3:
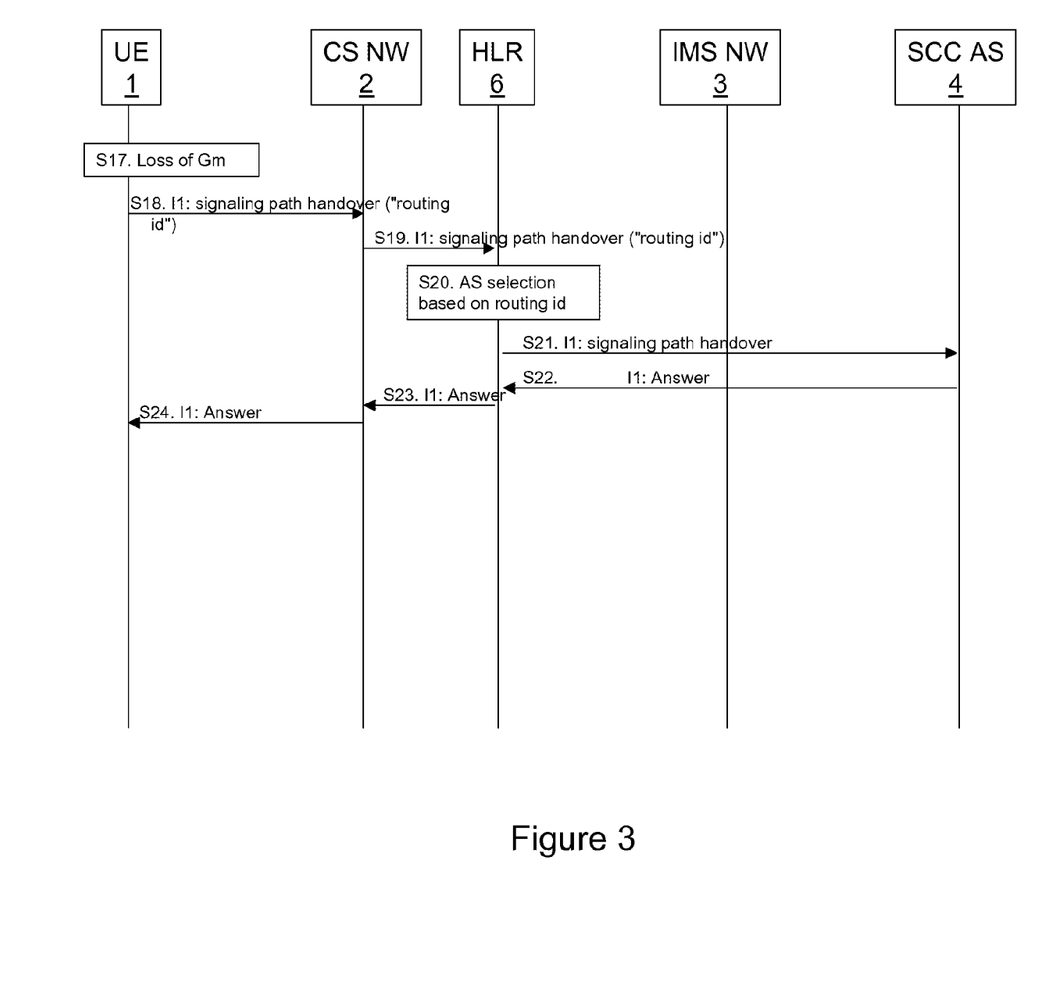
FIG. 3 is a signaling diagram illustrating handover signaling according to an embodiment of the invention.

As part of Session Description Protocol, in the media line related to the CS media.
m=audio-PSTN-
c=PSTN E164 +1234567
a=route-identifier:xyzabc FIG. 3 illustrates signaling path handover using the routing identifier. The following numbering corresponds to the numbering in FIG. 3:

S17. The UE 1 detects that it has lost Gm. There are several possible ways in which this detection can be made, for example by detecting that handover to GERAN has been performed and the UE does not support DTM, or detecting that a packet bearer (PDP context) has been lost.

S18. The UE 1 initiates a signaling path handover by sending a handover message over I1 to the CS network 2. In addition, the UE 1 includes the routing identifier in the handover message.

S19. The message is forwarded through the CS network 2 all the way to the HLR 6.

S20. The HLR 6 uses the routing identifier to identify the SCC AS 4 that should be used for the UE 1 and its handover message.

S21. The signaling path handover message is forwarded to correct SCC AS 4. The HLR may remove the routing identifier from the message before forwarding to the SCC AS 4, since such information is of no use to the SCC AS 4, although it is not essential to do so.

S22. An answer is sent from the SCC AS 4 to the HLR 6.

S23. The answer to the signaling path handover message is forwarded back through the CS network 2.

S24. The answer to the signaling path handover message is forwarded back to the UE 1.

Figure 4:
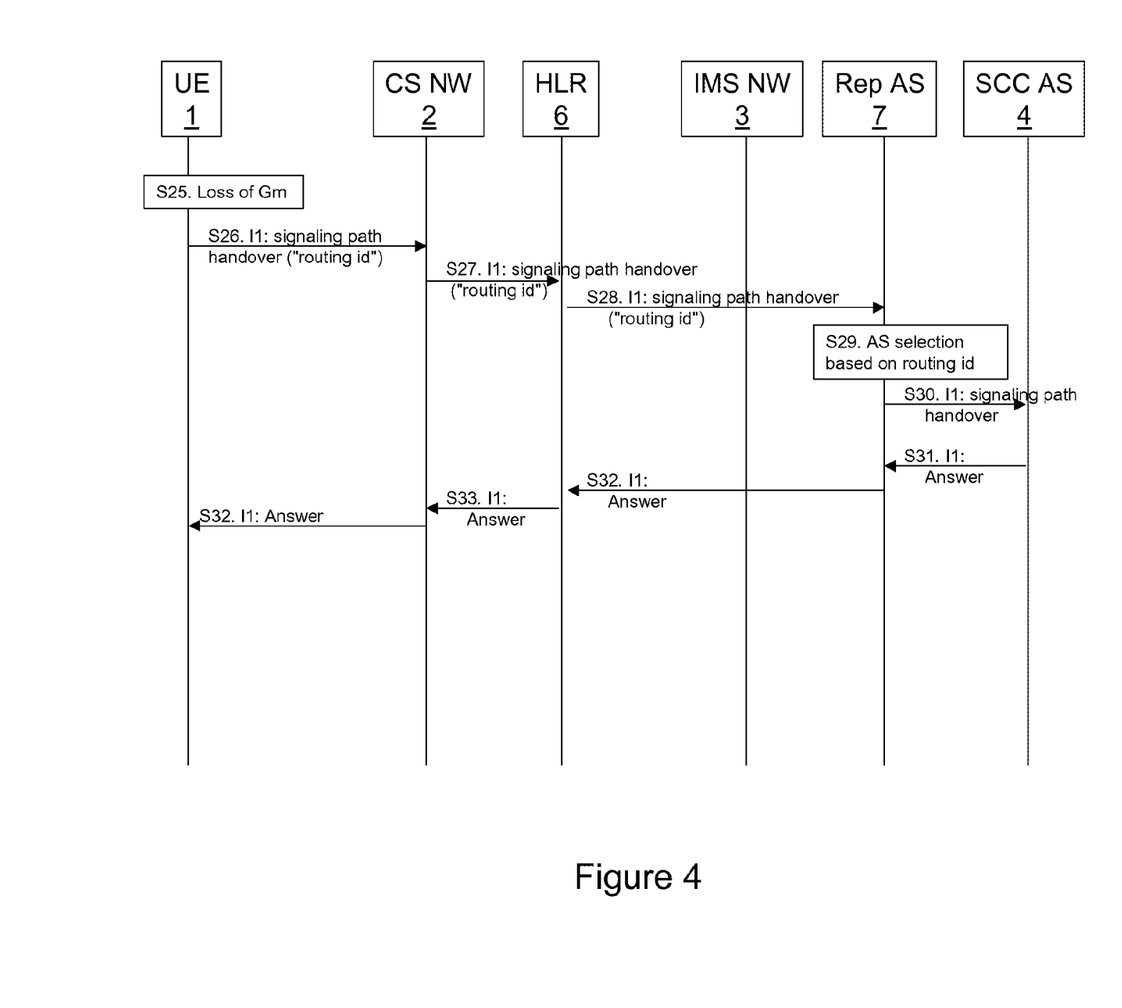
FIG. 4 is a signaling diagram illustrating signaling required for handover where a Representative AS 7 is used according to an embodiment of the invention.

In an alternative embodiment of the invention, a Representative AS represents the SCC AS. FIG. 4 is a signaling diagram illustrating signaling required for handover where a Representative AS 7 is used, with the following numbering corresponding to the numbering of FIG. 4:

S25. The UE 1 detects that it has lost Gm by some means.

S26. The UE 1 initiates a signaling path handover by sending a handover message over I1 to the CS network 2. In addition, the UE 1 includes the routing identifier in the message.

S27. The message is forwarded through the CS network 2 to the HLR 6.

S28. The HLR 6 identifies the Representative AS 7 that handles all SCC ASs 4, and forwards the message to the Representative AS 7.

S29. The Representative AS uses the routing identifier to identify the SCC AS 4 that should be used for the UE 1 and the handover message S30. The signaling path handover message is forwarded to correct SCC AS 4. Before forwarding the message, the Representative AS 7 may remove the routing identifier from the message, although this is not essential.

S31. An answer to the signaling path handover message is sent back from the SCC AS 4 to the Representative AS 7.

S32. The answer to the signaling path handover message is forwarded back to the HLR 6.

S33. The answer to the signaling path handover message is forwarded back through the CS network 2.

S34. The answer to the signaling path handover message is forwarded back to the UE 1.

According to a further embodiment of the invention, the routing identifier is used during service transfer from PS to CS, when performing service continuity (see IP Multimedia System (IMS) Service Continuity (Release 8), 3GPP TS 23.237 V8.0.0). The same problem is addressed, namely how the UE can reach the same SCC AS over I1 after a service transfer from PS to CS. Using the routing identifier ensures that signaling over I1 ends up in the same SCC AS that previously handled the session over Gm before the service transfer. In this case, the routing identifier can be allocated by the SCC AS when the SCC AS contacts the UE over I1 first (since the SCC AS would have the IMSI of the UE) after the service transfer.

Figure 5:
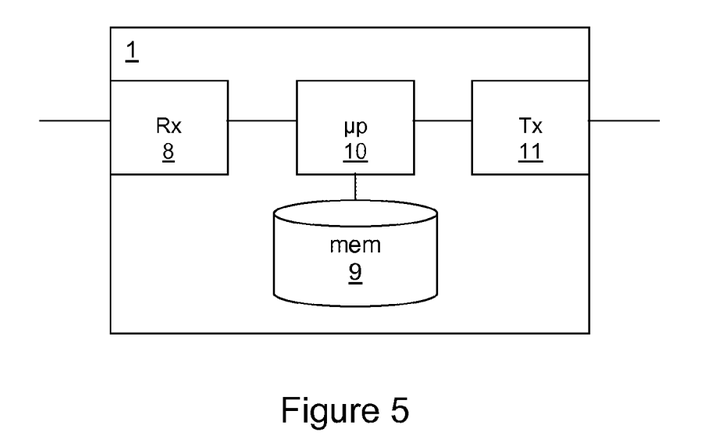
FIG. 5 illustrates schematically in a block diagram a User Equipment according to an embodiment of the invention.

Referring now to FIG. 5, there is illustrated a UE 1 according to an embodiment of the invention. The UE 1 is provided with a receiver 8 that receives the routing identifier, and a memory 9 for storing the routing identifier. A processor 10 is used to detect a loss of signaling between the UE 1 and the SCC AS 4, as described above, which may be either because of loss of availability of the Gm reference point or a handover from a PS to a CS access network. In the event of loss of signaling, a transmitter 11 is provided for sending a handover message that includes the routing identifier to the CS access network.

Figure 6:
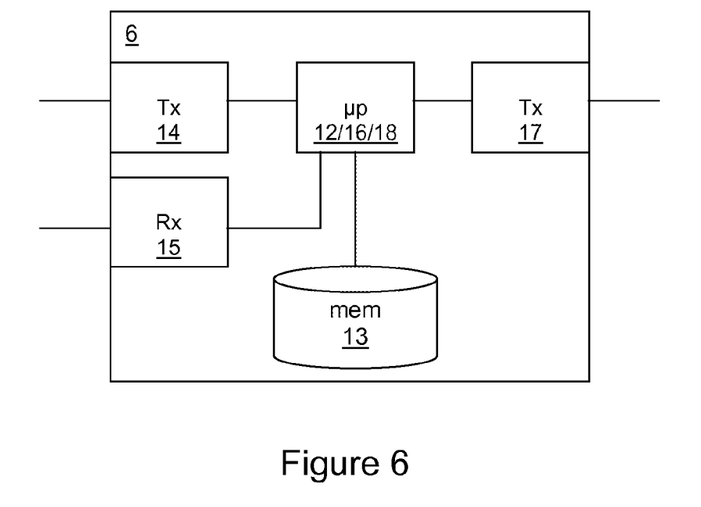
FIG. 6 illustrates schematically in a block diagram a Home Location Register according to an embodiment of the invention.

FIG. 6 illustrates schematically a HLR 6 according to an embodiment of the invention. The HLR 6 is provided with a processor 12 that allocates a routing identifier to the SCC AS 4 that is allocated to the UE 1. A memory 13 stores the routing identifier and an associated E.164 number for the SCC AS 4, and a transmitter 14 sends the routing identifier to the UE 1. A receiver 15 is arranged to receive a handover request from the UE 1. A second processor 16 uses the routing identifier received in the handover request to determine the E.164 number of the SCC AS 4, and a second transmitter 17 is arranged to for forward the handover request to the SCC AS 4. If required, a third processor 18 is arranged to remove the routing identifier from the received handover request prior to forwarding the handover request to the SCC AS 4. The three processors 12, 16, 18 are all embodiment in a single processor in the example of FIG. 7, although it will be appreciated that they may also be one or more separate processors.

Figure 7:
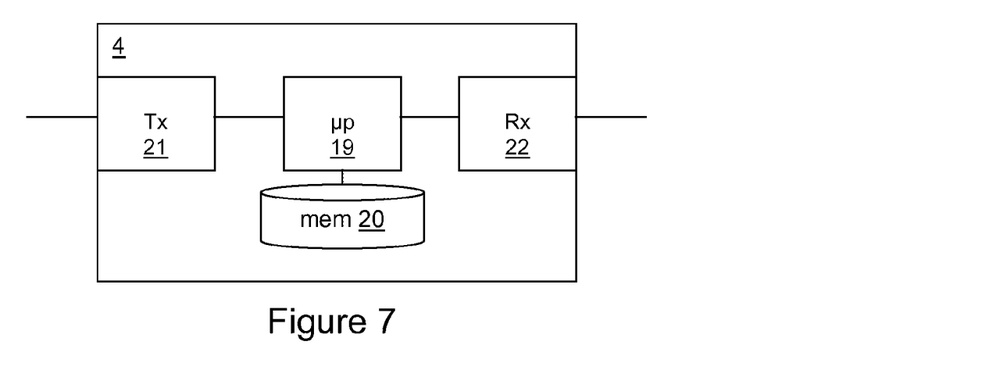
FIG. 7 illustrates schematically in a block diagram a Service Centralization and Continuity Application Server according to an embodiment of the invention.

Referring now to FIG. 7, there is illustrated schematically the SCC AS 4. The SCC AS 4 is provided with a processor 19 for allocating a routing identifier to the SCC AS 4. A memory 20 is provided for storing the routing identifier, and a transmitter 21 is provided for sending the routing identifier to the UE 1. A receiver 22 may also be provided for receiving signaling from the UE 1.

The invention ensures that the same SCC AS is selected when changing the signaling between Gm and I1, and also after performing service transfer from PS to CS. This improves the user experience of the service.

It will be appreciated by the person of skill in the art that various modifications may be made to the above-described embodiments without departing from the scope of the present invention.

The invention claimed is:

1. A method of maintaining service continuity for User Equipment accessing an IP Multimedia Subsystem communication network, the method comprising:
    establishing a routing identifier identifying a Service Centralization and Continuity Application Server allocated to the User Equipment;
    sending the routing identifier to the User Equipment;
    in the event of disruption to the service between the User Equipment and the Service Centralization and Continuity Application Server, sending a handover message from the User Equipment via a Circuit Switched access network, the message including the routing identifier; and
    forwarding the handover message to the identified Service Centralization and Continuity Application Server.

2. The method according to claim 1, wherein the disruption is caused by handover of signaling between the User Equipment and the Service Centralization and Continuity Application Server from a Gm reference point to an I1 reference point.

3. The method according to claim 1, wherein the disruption is caused by handover from a Packet Switched access network to the Circuit Switched access network.

4. The method according to claim 1, wherein the routing identifier is sent to the User Equipment in one of a Session Initiation Protocol 200 OK message and a Session Initiation Protocol INVITE message.

5. The method according to claim 1, wherein the handover message is sent from the Circuit Switched access network to a Representative Application Server, and the Representative Application Server selects a Service Centralization and Continuity Application Server on the basis of the routing identifier prior to forwarding the handover message to the identified Service Centralization and Continuity Application Server.

6. The method according to claim 1, wherein the handover message is sent in an Unstructured Supplementary Service Data format.

7. User Equipment for use in an IP Multimedia Subsystem communication network, the User Equipment comprising:
- a receiver for receiving a routing identifier identifying a Service Centralization and Continuity Application Server allocated to the User Equipment;
- a memory for storing the received routing identifier;
- a processor for detecting disruption to an ongoing service between the User Equipment and the Service Centralization and Continuity Application Server; and
- a transmitter for sending a handover message to an access network node, the handover message including the routing identifier.

8. The User Equipment according to claim 7, wherein the processor is arranged to detect a loss of Gm availability between the User Equipment and the Service Centralization and Continuity Application Server.

9. The User Equipment according to claim 7, wherein the processor is arranged to detect a handover from a Packet Switched access network to a Circuit Switched access network.

10. A Home Location Register for use in a communication network, comprising:
- a processor for allocating a routing identifier to a Service Centralization and Continuity Application Server allocated to a User Equipment;
- a memory for storing the routing identifier and an associated E.164 number for the Service Centralization and Continuity Application Server; and
- a transmitter for sending the routing identifier to the User Equipment.

11. The Home Location register according to claim 10, further comprising:
- a receiver for receiving a handover request from the User Equipment, the handover request including the routing identifier;
- a second processor for using the routing identifier to determine the E.164 number of the Service Centralization and Continuity Application Server; and
- a second transmitter for forwarding the handover request to the Service Centralization and Continuity Application Server.

12. The Home Location register according to claim 11, further comprising a third processor for removing the routing identifier from the received handover request prior to forwarding the handover request to the Service Centralization and Continuity Application Server.

* * * * *